United States Patent [19]

Sanderson

[11] Patent Number: 5,385,788
[45] Date of Patent: Jan. 31, 1995

[54] POLYESTERS

[75] Inventor: Alistair S. Charleston, Oxfordshire, United Kingdom

[73] Assignee: Coates Brothers PLC, United Kingdom

[21] Appl. No.: 961,723

[22] PCT Filed: Jul. 15, 1991

[86] PCT No.: PCT/GB91/01180

§ 371 Date: Mar. 12, 1993

§ 102(e) Date: Mar. 12, 1993

[87] PCT Pub. No.: WO92/01012

PCT Pub. Date: Jan. 23, 1992

[30] Foreign Application Priority Data

Jul. 13, 1990 [GB] United Kingdom ............... 9015396

[51] Int. Cl.$^6$ .................... B32B 15/08; B29C 53/00
[52] U.S. Cl. .................... 428/458; 528/272; 528/302; 528/308; 428/457; 428/480; 428/482; 525/437; 427/207.1; 427/216; 427/217; 427/218; 427/221; 427/231; 427/233; 427/234; 264/533; 264/544; 264/129
[58] Field of Search ............... 508/272, 302, 308; 428/457, 458, 480, 482; 525/437; 427/207.1, 216, 217, 218, 221, 231, 233, 234; 264/533, 544, 129

[56] References Cited

U.S. PATENT DOCUMENTS

| | | | |
|---|---|---|---|
| 3,160,679 | 12/1964 | Lew | 525/39 |
| 4,049,611 | 9/1977 | Hirzy | 524/98 |
| 4,172,822 | 10/1979 | Patzschke | 524/539 |
| 4,220,568 | 9/1980 | Patzschke | 528/295.3 |
| 4,278,785 | 7/1981 | Rosenfeld | 528/176 |
| 4,622,382 | 11/1986 | Fischer et al. | 528/295.3 |
| 4,876,304 | 10/1989 | Mertz et al. | 524/314 |

FOREIGN PATENT DOCUMENTS

| | | |
|---|---|---|
| 0021652 | 1/1981 | European Pat. Off. . |
| 0094650 | 11/1983 | European Pat. Off. . |
| 0167962 | 1/1986 | European Pat. Off. . |
| 0245665 | 11/1987 | European Pat. Off. . |
| 881968 | 5/1961 | United Kingdom . |
| 1016076 | 1/1966 | United Kingdom . |
| 1027149 | 4/1966 | United Kingdom . |
| 1048996 | 11/1966 | United Kingdom . |
| 1415279 | 11/1975 | United Kingdom . |
| 1559319 | 1/1980 | United Kingdom . |
| 1567293 | 5/1980 | United Kingdom . |
| 1603049 | 11/1981 | United Kingdom . |

OTHER PUBLICATIONS

International Search Report; Great Britian Search Report.

Primary Examiner—Samuel A. Acquah
Attorney, Agent, or Firm—Wigman, Cohen, Leitner & Myers

[57] ABSTRACT

A film-forming polyester derived from a monohydric alcohol component having one or more long chain alcohols, the alcohol forming from 5 to 60% by weight of the components from which the polyester is derived. Coating compositions including the polyesters are particularly suitable for applying to cans before the cans are subjected to a spin-necking operation.

15 Claims, No Drawings

POLYESTERS

This invention is concerned with improvements in and relating to polyester resins. More particularly, the invention is concerned with saturated, film-forming polyester resins suitable for use in coating compositions, especially coloured or pigmented coating compositions such as decorative or protective inks.

With the introduction of so-called "necked" cans for beverages, there has arisen a need for tough, flexible coating compositions for application to the cans, before necking, which compositions will withstand the deformation caused by the necking process.

It has now been found, in accordance with the present invention, that saturated, film-forming polyester resins derived, inter alia, from certain long chain alcohols (as hereinafter defined) can be useful components of coating compositions for application, for example, to cans which are later to be necked.

According to the invention, therefore, there is provided a film-forming polyester resin which is, inter alia, derived from a monohydric alcohol component comprising one or more long chain alcohols as hereinafter defined, the said alcohol forming from 5 to 60% by weight of the components from which the polyester is derived.

By the term "long chain monohydric alcohol", as used herein, we mean a saturated or unsaturated monohydric alcohol having a hydroxyl group attached to an organic residue comprising a straight or branched chain, which chain may be interrupted by one or more hetero-atoms (such as oxygen, sulphur or nitrogen atoms); the chain structure containing a total of at least six carbon atoms (and hereto-atoms, if any), preferably from 6 to 20, especially 10 to 24 carbon atoms (and hetero-atoms, if any).

As is well known, polyester resins are produced by the polycondensation of:
  (i) a polycarboxylic acid component comprising one or more polycarboxylic acids;
  (ii) a polyhydric alcohol component comprising one or more polyhydric alcohols; and, optionally,
  (iii) a monofunctional component comprising one or more monohydric alcohols and/or one or more monocarboxylic acids.

The polyesters may, and often will, be prepared by polycondensation of a mixture of the above ingredients. However, they may also be prepared in stages, e.g. by the polycondensation of the polycarboxylic acid component and the polyhydric alcohol component (optionally together with monofunctional components such as monocarboxylic acids, other monohydric alcohols, etc) to yield an acidic polyester; followed by reaction of the polyester with the appropriate long chain alcohol. In the following description the term "starting mixtures" is intended to refer not only to a mixture of the three basic components actually to be polycondensed but also to the theoretical mixture from which the polyester is eventually derived.

As is well known, the nature of a polyester, e.g. its average molecular weight, degree of cross-linking and acid number, will depend upon the nature of the various polyfunctional components, i.e. their degree of functionality, and the ratios between the various components of the starting mixture. The polyesters of the invention are derived from an appropriate starting mixture containing from 5 to 60% percent by weight of long chain alcohol, preferably 10 to 60% by weight thereof, more preferably 20 to 40% by weight thereof and, especially, 22 to 32% by weight thereof. The other components of the starting mixture for the resin are suitably of such a nature and in such amounts that the final polyester has a molecular weight of UP to 20,000, preferably up to 10,000 and more preferably from 400 to 5,000, (especially 500 to 3,000), and an acid number of up to 300 mgKOH/g, more preferably from 0 to 150 mgKOH/g, preferably 4 to 80 mgKOH/g.

The polyesters of the invention are preferably branched rather than linear materials and, thus, at least one of the polyfunctional components should be tri-functional or higher, tri-functionality generally affording sufficient branching. Suitable tri-functional carboxylic acids for use in the preparation of the polyesters include pyromellitic dianhydride and trimellitic anhydride. Suitable polyhydric alcohols include trimethylolpropane, pentaerythritol and glycerol. The polyester will also generally be derived from one or more difunctional components and suitable dicarboxylic acids and dihydric alcohols include isophthalic acid, terephtahalic acid, phthalic anhydride, adipic acid, sebacic acid, neopentylglycol, hexane diol and ethylene glycol.

Suitable long-chain alcohols for use in the preparation of polyesters of the invention include naturally derived aliphatic alcohols such as cetyl and stearyl alcohols; and synthetic alcohols such as the branched $C_{13}$ alcohol sold under the Trade Name TRIDECANOL, a trademarked composition comprising mixed isomers of $C_{13}$ primary alcohols sold by Imperial Chemical Industries Limited and mixtures such as the $C_{13}/C_{15}$ alcohol mixture sold under the trade name SYNPROL, a trademarked composition comprising a mixture of $C_{13}/C_{15}$ fatty aliphatic alcohols sold by Imperial Chemical Industries Limited. The long chain alcohols may, as noted above, be saturated or unsaturated (preferably the former) and, further, may contain hetero atoms such as oxygen atoms. Thus long chain aliphatic alcohols may take the form of mono-alkyl ethers or esters of polyalkylene oxide diols.

The alcohols may, if desired, be substituted with substituents such as halogen atom, etc.

The polyesters of the invention will be prepared by polycondensation of a mixture of the starting materials at elevated temperature, e.g. at a temperature of 130° to 260° C., and optionally in the presence of a catalyst such as dibutyl tin dilaurate. The progress of the polycondensation may be followed, as is well known, by monitoring the amount of water evolved during the course of the polycondensation and also by monitoring the acid value of the reaction mixture at various stages.

As noted above, the polyester resins of the invention are particularly suitable for use as components of coating compositions, typically pigmented coating compositions. Such compositions will generally comprise the polyester resin together with a pigment and a solvent or liquid vehicle (which may itself comprise one or more long chain alcohols). The coating composition suitably also contains a curing agent, for curing the composition under the action of heat and examples of such curing agents include melamine/formaldehyde resins blocked isocyanates, epoxy resins or mixtures thereof. In addition, the compositions may also contain other optional ingredients such as wetting agents, catalysts, amines, waxes, antifly materials and other resins to improve flow, gloss, pigment wetting, flexibility and the like.

Suitably, coating compositions in accordance with the invention, contain from 5 to 90% by weight, preferably 15 to 60% by weight, of polyester resin; from 0 to 70% by weight, preferably 0 to 30% by weight of pigment; from 5 to 50% by weight, preferably 15 to 40% by weight of solvent; and from 2.5 to 35% by weight, preferably 7.5 to 30% by weight of curing agent; together with 2 to 40% by weight, preferably 5 to 20% by weight of other optional ingredients.

In order that the invention may be well understood the following examples are given by way of illustration only. In the Examples all parts and percentages are by weight unless otherwise stated.

Resin preparations (in Examples 1–5) were carried out in a round-bottom multi-neck flask fitted with a thermometer, electric stirrer, nitrogen gas purge, and partial and water-cooled condensers. In each case the water from the esterification reaction was distilled and collected as the reaction proceeded. The end point for each preparation was taken to be when the REL hot cone viscosity was of the order of 3–26 poise at 150° C.

EXAMPLE 1

27.5 parts of hexanol, 48.37 parts of trimellitic anhydride and 0.2 parts of an antioxidant (triphenyl phosphite) were introduced into the flask and were heated to 180° C. and held at this temperature for an hour during which the mixture changed from a white dispersion to a clear golden liquid. The temperature was then reduced to 150° C. and 5.85 parts of neopentyl glycol and 12.08 parts of trimethylol propane were added. The reaction mixture was then polycondensed at a temperature of 150°–185° C. (in order to prevent hexanol loss, a Dean and Stark condenser system was employed to return distilled hexanol to the flask. The reaction was stopped when the product had a cone and plane viscosity of 26 poise 150° C. and acid value of 76. The bake solids of the mixture at this stage was 96.2% indicating a satisfactory degree of hexanol reaction. The mixture was thinned with SYNPROL $C_{13}/C_{15}$ to a bake solids of 58.2% and a Laray viscosity of 220 poise.

EXAMPLE 2

21.74 parts of $C_{13}$ primary alcohol, 10.71 parts of $C_{15}$ primary alcohol, 24.92 parts of trimethylol propane, 25.98 parts of isophthalic acid and 0.2 parts of antioxidant were added to the flask and polycondensed at 180° to 230° C. to give a product having an acid value of less than 10. The mixture was then cooled to 160° C. and 16.4 parts of trimellitic anhydride added. Further polycondensation was effected at a temperature of 165°–185° C. to give a final viscosity of 4.5 poise at 150° C. and an acid value of 43. The bake solids of the resin at this stage were 94.1%. The mixture was cooled and thinned with SYNPROL $C_{13}/C_{15}$ alcohol mixture to a solids content of 69.8% and a Laray viscosity of 1600 poise.

EXAMPLE 3

A mixture comprising 30.25 parts of a blend of $C_{16}/C_{18}$ primary alcohols (approximately 26:67), 41.35 parts of trimellitic anhydride and 0.2 parts of antioxidant were added to the flask and heated to 175° C. This temperature was maintained for 3 hours after which time the total acid value was 422. The mixture was then cooled to 120° C. and 28.2 parts of neopentyl glycol were added. The mixture was then further polycondensed at 160°–185° C. to a final viscosity of 17.2 poise at 150° C. and an acid value of 64. The mixture was then thinned with SYNPROL $C_{13}/C_{15}$ alcohol mixture to a final solids content of 64.9% and a Laray viscosity of 240 poise.

EXAMPLE 4

10.89 parts of $C_{13}$ primary alcohol, 22.13 parts of $C_{15}$ primary alcohol, 25.36 parts of trimethylol propane, 26.44 parts of isopthalic acid, 0.18 parts of antioxidant and 15 parts of trimellitic anhydride were charged to the flask and polycondensed at 180°–235° C. to give a reaction mixture having a viscosity of 2.8 poises at 150° C. at an acid value of 7.5. The resin was diluted with SYNPROL $C_{13}/C_{15}$ alcohol mixture to give a solids content of 67% and a Laray viscosity of 410 poises.

EXAMPLE 5

8.32 parts of a primary $C_{13}$ alcohol, 16.89 parts of primary $C_{15}$ alcohol, 44.35 parts of trimellitic anhydride and 0.2 parts of antioxidant added to the flask and heated to 175° C. and maintained at this temperature for 1 hour. The mixture was then cooled to 150° C. and 30.24 parts of neopentyl glycol added thereto. Polycondensation was carried out at a temperature between 155° and 170° C. to give a final viscosity of 15.8 poise at 150° C. and an acid value of 66.5. The mixture was thinned with SYNPROL $C_{13}/C_{15}$ alcohol mixture to a final solids content of 62.7% and a Laray viscosity of 300 poise.

Inks were formulated using the various resin solutions prepared above by firstly preparing a concentrate, on a three roll mill, and comprising:

| Pigment | 35 parts |
| --- | --- |
| Wetting agent | 3.5–4 parts |
| Resin solution | 48 parts |
| Reducer | 13.5 to 12.0 parts |

The inks were formulated from the concentrate using:

| Concentrate | 58.5 parts |
| --- | --- |
| Resin solution | 12.4 parts |
| Melamine/formaldehyde resin | 12 parts |
| Amine | 2 parts |
| Acid catalyst | 2 parts |
| Wax | 4.6 parts |
| Antifly agent | 2.5 parts |
| Reducer | 6.0 parts |

The inks so prepared were tested by printing them onto un-necked cans and subsequently necking the cans.

What is claimed is:

1. A process for making a coated can body, comprising the steps of: applying to the can body a composition comprising a colorant, an inert diluent and a film-forming polyester resin produced by the polycondensation of: (i) a polycarboxylic acid component comprising one or more polycarboxylic acids; and (ii) a polyhydric alcohol component comprising one or more polyhydric alcohols, and said alcohol component forming from 5 to 60% by weight of the components from which the polyester is derived; and subjecting the can body to a spin necking operation.

2. A process as claimed in claim 1 in which the alcohol of the polyester contains a total of from 6 to 20 carbon atoms.

3. A process as claimed in claim 1 or claim 2 in which the polyester has a number average molecular weight of from 400 to 10,000.

4. A polyester as claimed in claim 1 or claim 2 in which the polyester has an acid number of from 0 to 150 mg KOH/g.

5. A process as claimed in claim 1 or claim 2 in which the composition also contains a curing agent.

6. A process as in claim 2 in which the alcohol of the polyester contains hetero atoms.

7. A process as in claim 1, wherein said alcohols include long-chain alcohols selected from the group of alcohols consisting of cetyl alcohol, stearyl alcohol, branched $C_{13}$ alcohol, and mixtures of $C_{13}/C_{15}$ alcohols.

8. A coated can made in accordance with the process of claim 1.

9. A coated can made in accordance with the process of claim 2.

10. A coated can made in accordance with the process of claim 3.

11. A coated can made in accordance with the process of claim 4.

12. A coated can made in accordance with the process of claim 5.

13. A coated can made in accordance with the process of claim 6.

14. A coated can made in accordance with the process of claim 7.

15. A process for making a coated can body, comprising the steps of:
applying to the can body a composition comprising a colorant, an inert diluent and a film-forming polyester resin produced by the polycondensation of:
(i) a polycarboxylic acid component comprising one or more polycarboxylic acids;
(ii) a polyhdric alcohol component comprising one or more polyhydric alcohols; and
(III) a monofunctional component comprising one or more polyhydric alcohols, together with one or more monocarboxylic acids, the monohydric alcohol component comprising one or more long chain fatty alcohols and
said alcohol components forming from 5 to 60% by weight of the components from which the polyester is derived, and
subjecting the can body to a spin necking operation.

* * * * *